United States Patent
Beer et al.

(10) Patent No.: US 7,274,673 B2
(45) Date of Patent: Sep. 25, 2007

(54) METHOD AND APPARATUS FOR DETECTION OF PORT NAME IN A LOOP NETWORK

(75) Inventors: Reginald Beer, Eastleigh (GB); Paul Nicholas Cashman, Alton (GB); Paul Hooton, Eastleigh (GB); Neil Morris, Southsea (GB); Robert Frank Maddock, Christchurch (GB); Robert Bruce Nicholson, Southsea (GB)

(73) Assignee: International Business Machines Corporation, Armonk, NY (US)

( * ) Notice: Subject to any disclaimer, the term of this patent is extended or adjusted under 35 U.S.C. 154(b) by 1093 days.

(21) Appl. No.: 10/290,799

(22) Filed: Nov. 8, 2002

(65) Prior Publication Data

US 2003/0137987 A1 Jul. 24, 2003

(30) Foreign Application Priority Data

Jan. 19, 2002 (GB) ................................. 0201212.8

(51) Int. Cl.
*H04L 12/28* (2006.01)
(52) U.S. Cl. ........................................ 370/258; 370/400
(58) Field of Classification Search .................... None
See application file for complete search history.

(56) References Cited

U.S. PATENT DOCUMENTS

| | | | |
|---|---|---|---|
| 4,777,330 A | 10/1988 | Nakayashiki et al. | ......... 178/69 |
| 6,081,847 A * | 6/2000 | Lin | ............. 370/282 |
| 6,151,659 A * | 11/2000 | Solomon et al. | ............. 711/114 |
| 6,260,079 B1 * | 7/2001 | White | ............ 710/8 |
| 6,353,612 B1 * | 3/2002 | Zhu et al. | ............ 370/360 |
| 6,421,711 B1 * | 7/2002 | Blumenau et al. | ......... 709/213 |
| 6,877,073 B2 * | 4/2005 | Sanada et al. | ............. 711/152 |
| 6,898,184 B1 * | 5/2005 | Anderson et al. | ........... 370/241 |
| 7,107,332 B2 * | 9/2006 | Murotani et al. | ........... 709/223 |
| 2001/0028657 A1 | 10/2001 | Brewer et al. | ............. 370/406 |
| 2002/0010881 A1 * | 1/2002 | White | ........................ 714/44 |

FOREIGN PATENT DOCUMENTS

| | | |
|---|---|---|
| EP | 0725514 A1 | 8/1996 |
| EP | 0751642 A2 | 1/1997 |
| WO | WO-99/57827 A1 | 11/1999 |

OTHER PUBLICATIONS

American National Standard for Technology, "Fibre Channel Arbitrated Loop (FC-AL-2)", Revision 7.0, Apr. 1, 1999, 154 pages.

* cited by examiner

*Primary Examiner*—Chi Pham
*Assistant Examiner*—Anh-Vu Ly
(74) *Attorney, Agent, or Firm*—Harrington & Smith, PC

(57) ABSTRACT

A method and apparatus for detection of a port name in a loop network is provided, particularly a loop network in the form of a Fibre Channel Arbitrated Loop (FC-AL). The loop network (100) has a plurality of devices (120) each device (120) having at least one port (211, 212) on the loop network (100). The method includes determining which ports (211, 212) are populated with devices (120) for which the unique port name (WWPN) is not known. The populated ports are then all bypassed and a mode is entered on the loop network (100) in which idle frames are transmitted around the loop network (100). One port is un-bypassed at a time and the port name from the un-bypassed port is received and recorded. The port name is received from the un-bypassed port in a Loop Initialisation Select Master (LISM) frame transmitted by the un-bypassed port.

24 Claims, 6 Drawing Sheets

METHOD AND APPARATUS FOR DETECTION OF PORT NAME IN A LOOP NETWORK

FIELD OF INVENTION

This invention relates to a method and apparatus for detection of a port name in a loop network. In particular, the invention relates to loop networks in the form of Fibre Channel Arbitrated Loops. The invention could also apply to other loop networks which, like Fibre Channel Arbitrated Loop networks, use unique identification names for devices in the network.

BACKGROUND OF THE INVENTION

Fibre Channel Arbitrated Loop (FC-AL) architecture is a member of the Fibre Channel family of ANSI standard protocols. FC-AL is typically used for connecting together computer peripherals, in particular disk drives. The FC-AL architecture is described in NCITS working draft proposals, American National Standard for Information Technology "Fibre Channel Arbitrated Loop (FC-AL-2) Revision 7.0", 1 Apr. 1999 and "Fibre Channel Arbitrated Loop (FC-AL-3) Version 1.0", Sep. 20, 1999.

Electronic data systems can be interconnected using network communication systems. Area-wide networks and channels are two technologies that have been developed for computer network architectures. Area-wide networks (e.g. LANs and WANs) offer flexibility and relatively large distance capabilities. Channels, such as the Small Computer System Interface (SCSI), have been developed for high performance and reliability. Channels typically use dedicated short-distance connections between computers or between computers and peripherals.

Fibre Channel technology has been developed from optical point-to-point communication of two systems or a system and a subsystem. It has evolved to include electronic (non-optical) implementations and has the ability to connect many devices, including disk drives, in a relatively low-cost manner. This addition to the Fibre Channel specifications is called Fibre Channel Arbitrated Loop (FC-AL).

Fibre Channel technology consists of an integrated set of standards that defines new protocols for flexible information transfer using several interconnection topologies. Fibre Channel technology can be used to connect large amounts of disk storage to a server or cluster of servers. Compared to Small Computer Systems Interface (SCSI), Fibre Channel technology supports greater performance, scalability, availability, and distance for attaching storage systems to network servers.

Fibre Channel Arbitrated Loop (FC-AL) is a loop architecture as opposed to a bus architecture like SCSI. FC-AL is a serial interface, where data and control signals pass along a single path rather than moving in parallel across multiple conductors as is the case with SCSI. Serial interfaces have many advantages including: increased reliability due to point-to-point use in communications; dual-porting capability, so data can be transferred over two independent data paths, enhancing speed and reliability; and simplified cabling and increased connectivity which are important in multi-drive environments. As a direct disk attachment interface, FC-AL has greatly enhanced I/O performance.

Devices are connected to a FC-AL using hardware which is termed a "port". A device which has connections for two loops has two ports or is "dual-ported".

The operation of FC-AL involves a number of ports connected such that each port's transmitter is connected to the next port's receiver, and so on, forming a loop. Each port's receiver has an elasticity buffer that captures the incoming FC-AL frame or words and is then used to regenerate the FC-AL word as it is re-transmitted. This buffer exists to deal with slight clocking variations that occur. Each port receives a word, and then transmits that word to the next port, unless the port itself is the destination of that word, in which case it is consumed. The nature of FC-AL is therefore such that each intermediate port between the originating port and the destination port gets to 'see' each word as it passes around the FC-AL loop.

FC-AL architecture may be in the form of a single loop. Often two independent loops are used to connect the same devices in the form of dual loops. The aim of these loops is to provide an alternative path to devices on a loop should one loop fail. A single fault should not cause both loops to fail simultaneously. More than two loops can also be used.

FC-AL devices typically have two sets of connections allowing them to be attached to two FC-ALs. Thus, in a typical configuration, two independent loops exist and each device is physically connected to both loops. When the system is working optimally, there are two possible loops that can be used to access any dual-ported device.

A FC-AL can incorporate bypass circuits with the aim of making the FC-AL interface sufficiently robust to permit devices to be removed from the loop without interrupting throughput and sacrificing data integrity. If a disk drive fails, port bypass circuits attempt to route around the problem so all disk drives on the loop remain accessible. Without port bypass circuits a fault in any device will break the loop.

In dual loops, port bypass circuits are provided for each loop and these provide additional protection against faults. A port can be bypassed on one loop while remaining active on the dual loop.

A typical FC-AL may have one or two host bus adapters (HBA) and a set of approximately six disk drive enclosures or drawers, each of which may contain a set of ten to sixteen disk drives. There is a physical cable connection between each enclosure and the HBA in the FC-AL. Also, there is a connection internal to the enclosure or drawer, between the cable connector and each disk drive in the enclosure or drawer, as well as other components within the enclosure or drawer, e.g. SES device (SCSI Enclosure Services node) or other enclosure services devices.

Components in a loop can be categorised as "initiators" or "targets", or both depending on their function in the loop. For example, a host bus adapter is an initiator and a disk drive is a target. Initiators can arbitrate for a communication path in the loop and can choose a target. A target can request the transfer of a command, data, status, or other information to or from the initiator.

In loop networks such as FC-ALs, there are many error scenarios where the location of a device in the loop needs to be determined. This can be quite difficult in FC-AL as an address of a device may have no physical association. The final address that a device may have (its AL_PA_Arbitrated Loop Physical Address) could be a soft address which is not related to any enclosure that the device may be in. To enable correct services of the FC-AL, it must be possible to locate a specific device.

Enclosures that house devices often have bypasses and drive detect capabilities such that they can know which devices are part of the FC-AL. However, the enclosures do not know whether these devices have been successful in getting an AL_PA or if they are non-participating devices.

Non-participating devices are ports which are enabled in the loop but which do not have an AL_PA.

There is a known mechanism called ADISC that asks the device what its preferred hard address would be and this could be used to identify the enclosure that the device is in. However, this relies on the enclosure having a unique base address and also relies on the topology of the other enclosures not getting in the way. It is possible for a different enclosure with a different topology and the same base address to confuse the resolution of a device location.

Each port in a loop network has a port identifier called a "World Wide Port Name" (WWPN). Each node on a loop in the form of devices or host bus adapters also has a World Wide Node Name (WWNN). These are referred to as Node Names and Port Names. To ensure that the WWPN and WWNN are unique they may contain, for example, a unique identifier of the manufacturer of the device including the port and the manufacturer's serial number of the device. The WWPN is too long (usually 64 bits) to be used for source and destination addresses transmitted over the network and therefore the AL_PA (Arbitrated Loop Physical Address) is used as a temporary address that is unique to the configuration of the network at any given time.

Ideally the device's World Wide Node Name (WWNN) and World Wide Port Name (WWPN) would be known and each enclosure's controlling node should know the WWNN and WWPN of all devices in its enclosure.

This invention uses the enclosure's ability to detect which device slots are populated and the ability to bypass individual NL_Ports from the FC-AL itself. The standard FC-AL Loop Initialisation Procedure is used to detect each device's WWPN (Port Name) as supplied in the LISM frame or to detect that that NL_Port is in the non-participating mode. This now allows service aids to identify the enclosure and the device's WWPN that is associated with any service action.

DISCLOSURE OF THE INVENTION

According to a first aspect of the present invention there is provided a method for detection of a port name in a loop network, the loop network having a loop, a plurality of devices each device having at least one port on the loop network and each port having a unique hard port name, the method comprising: determining which ports are populated with devices for which the port name is not known; bypassing all the populated ports; entering a mode on the loop network in which idle frames are transmitted around the loop network; and un-bypassing one port at a time and receiving the port name from the un-bypassed port, without affecting any existing port bypasses.

The un-bypassed port may transmit frames including its port name.

The method may include un-bypassing all the populated ports once all the unique port names of the populated ports are known.

The loop network may include at least one enclosure containing one or more devices, each enclosure having an enclosure control device with bypass control over the ports in the enclosure. An enclosure is preferably bypassed prior to entering the mode in which idle frames are transmitted around the loop network within the enclosure.

Each enclosure may have a determining device, the determining device sending the idle frames and receiving the port names.

The loop network may be a Fibre Channel Arbitrated Loop (FC-AL) and the unique port name may be the World Wide Port Name. The port name may be received from the un-bypassed port in a Loop Initialisation Select Master (LISM) frame transmitted by the un-bypassed port.

If no port name is received from a device, the device may be non-participating or faulty.

According to a second aspect of the present invention there is provided an apparatus for detection of a port name in a loop network, the apparatus comprising: a loop network including at least one loop; a plurality of devices connected to the loop via ports, each port having a unique hard port name; means for bypassing ports on the loop; means for determining which ports are populated on the loop with devices for which the port name is not known; a determining device capable of entering a mode on the loop network in which idle frames are transmitted around the loop network; the determining device receiving and recording the port names for each populated port on the loop.

The loop network may include at least one enclosure containing one or more devices, each enclosure having an enclosure control device with bypass control over the ports in the enclosure.

An enclosure may include means for bypassing the enclosure from the loop network and the determining device entering a mode in the bypassed enclosure in which idle frames are transmitted around the enclosure. The determining device may be the enclosure control device.

The loop network may be a dual loop network in which a device has two ports, one on each loop.

The loop network may be a Fibre Channel Arbitrated Loop (FC-AL) and the unique port name may be the World Wide Port Name. The port name may be received from an un-bypassed port in a Loop Initialisation Select Master (LISM) frame transmitted by the un-bypassed port.

According to a third aspect of the present invention there is provided a computer program product stored on a computer readable storage medium comprising computer readable program code means for detection of device names in a loop network, the loop network having a loop, a plurality of devices each device having at least one port on the loop network and each port having a unique hard port name, the program code means performing the steps of: determining which ports are populated with devices for which the port name is not known; bypassing all the populated ports; entering a mode on the loop network in which idle frames are transmitted around the loop network; un-bypassing one port at a time and receiving the port name from the un-bypassed port, without affecting any existing port bypasses.

BRIEF DESCRIPTION OF THE DRAWINGS

Embodiments of the invention are now described, by means of examples only, with reference to the accompanying drawings in which.

DESCRIPTION OF THE PREFERRED EMBODIMENTS

A loop network system with a plurality of serially connected ports in the form of a Fibre Channel Arbitrated Loop (FC-AL) is described for connecting together computer peripherals, in particular disk drives. The described embodiments are given in the context of FC-AL architecture although the described method and apparatus could be applied to any unidirectional loop network.

Figure 1A:
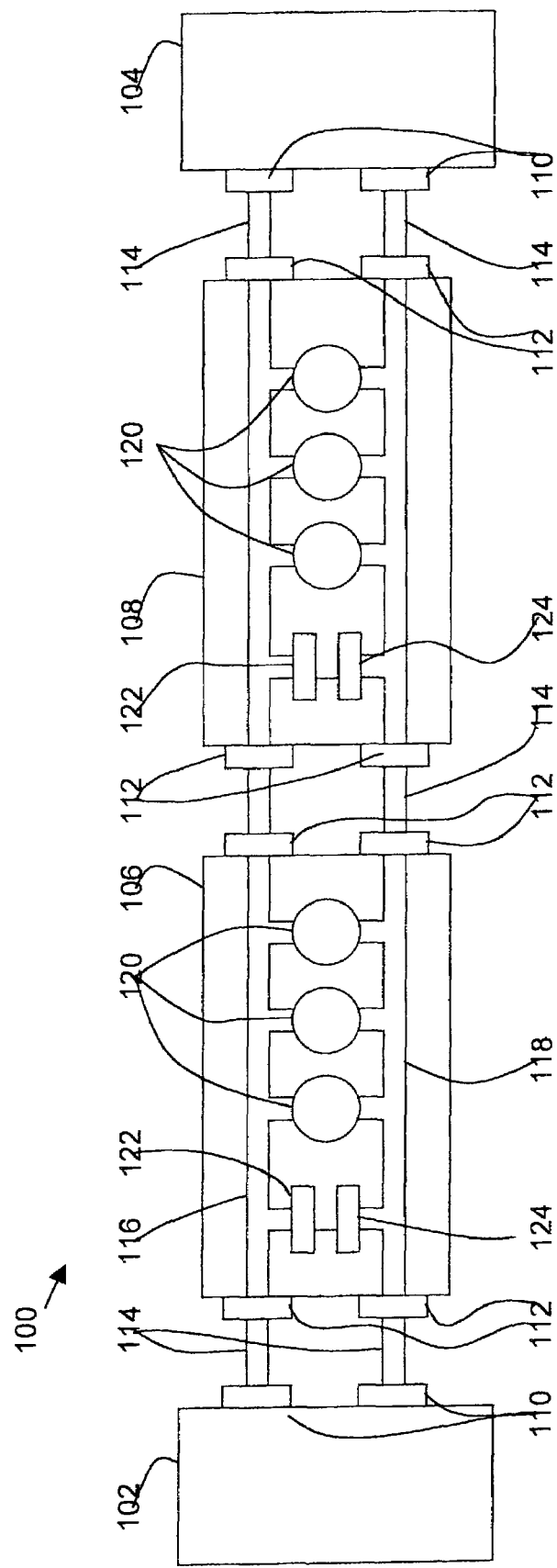
FIG. 1A is a diagram of a dual loop network in accordance with the prior art.

Referring to FIG. 1A, an exemplary loop network 100 is shown in the form of a Fibre Channel Arbitrated Loop with two host bus adapters 102, 104. FIG. 1A shows one form of a loop network on which the present invention may be practiced. However, not all the components of the loop network 100 of FIG. 1A are essential for the operation of the present invention.

The loop network 100 in the shown embodiment has two enclosures 106, 108. Each enclosure in this embodiment has three disk drives 120 although in practice there are usually 10 or more disk drives in an enclosure. Dual loops 116, 118 each connect the components in the loop network 100. A first loop 116 is shown along the top of the loop network 100 in the diagram and a second loop 118 is shown along the bottom of the loop network 100 in the diagram.

The adapters 102, 104 have external connectors 110 for cables 114 connecting each loop 116, 118 from the adapters 102, 104 to external connectors 112 of the enclosures 106, 108. Cables 114 also connect the two enclosures 106, 108 such that each loop 116, 118 passes from one enclosure 106 to the next enclosure 108.

Each loop 116, 118 passes from the first adapter 102 via an adapter external connector 110, a cable 114 and an enclosure external connector 112 to the first enclosure 106. In the first enclosure 106 of the exemplary loop network 100, each loop 116, 118 passes through its own enclosure control device 122, 124 which may be, for example, a SES (SCSI Enclosure Services) device or a SAF-TE device and then through each of the disk drives 120 in turn. The two loops 116, 118 both pass through the same shared disk drives 120. Each loop 116, 118 then leaves the first enclosure via an enclosure external connector 112 and passes through a cable 114 to a second enclosure 108 which it enters via an enclosure external connector 112. The second enclosure 108 has the same set of components as the first enclosure 106. Each loop 116, 118, after passing through the second enclosure 108 is connected to the second adapter 104 via enclosure external connectors 112, cables 114 and adapter external connectors 110.

In each enclosure 106, 108, a loop 116 enters from an external connector 112 and is routed through each of the disk drives 120 and an enclosure control device 122, 124. Each disk drive 120 or enclosure control device 122, 124 has a bypass circuit to enable it to be bypassed by the loop, if required. The disk drives 120 are examples of dual port devices in that they are common to both the loops 116, 118 of the loop network 100.

An enclosure control device 122, 124 is provided on each loop 116, 118 in each enclosure and the two enclosure control devices 122, 124 are connected together through the enclosure's backplane. One enclosure control device can be used to control the other enclosure control device. An enclosure control device manages an enclosure and provides a point of control for each enclosure. It can monitor parameters such as power and cooling and obtain information as to which slots for disk drives are occupied. The enclosure control devices can be in the form of SES devices which accept a limited set of SCSI commands. Enclosure control devices can be used to instruct a bypass of a disk drive and to check which disk drives are bypassed.

In the embodiment shown in FIG. 1A, a dual loop network 100 is shown by way of example, with two enclosures 106, 108 each with three disk drives 120 and two enclosure control devices 122, 124, one for each loop. Typical loop networks may have one or two host bus adapters and a set of six or so disk drive enclosures each of which may typically contain a set of ten to sixteen disk drives.

All devices in the loop 100, including host bus adapters 102, 104, disk drives 120 and any enclosure control devices 122, 124 have hardware connections to a loop 116, 118 referred to as ports. Each port has a receiver and a transmitter. The ports are connected such that each port's transmitter is connected to the next port's receiver, and so on, forming the loop 116, 118.

Figure 1B:
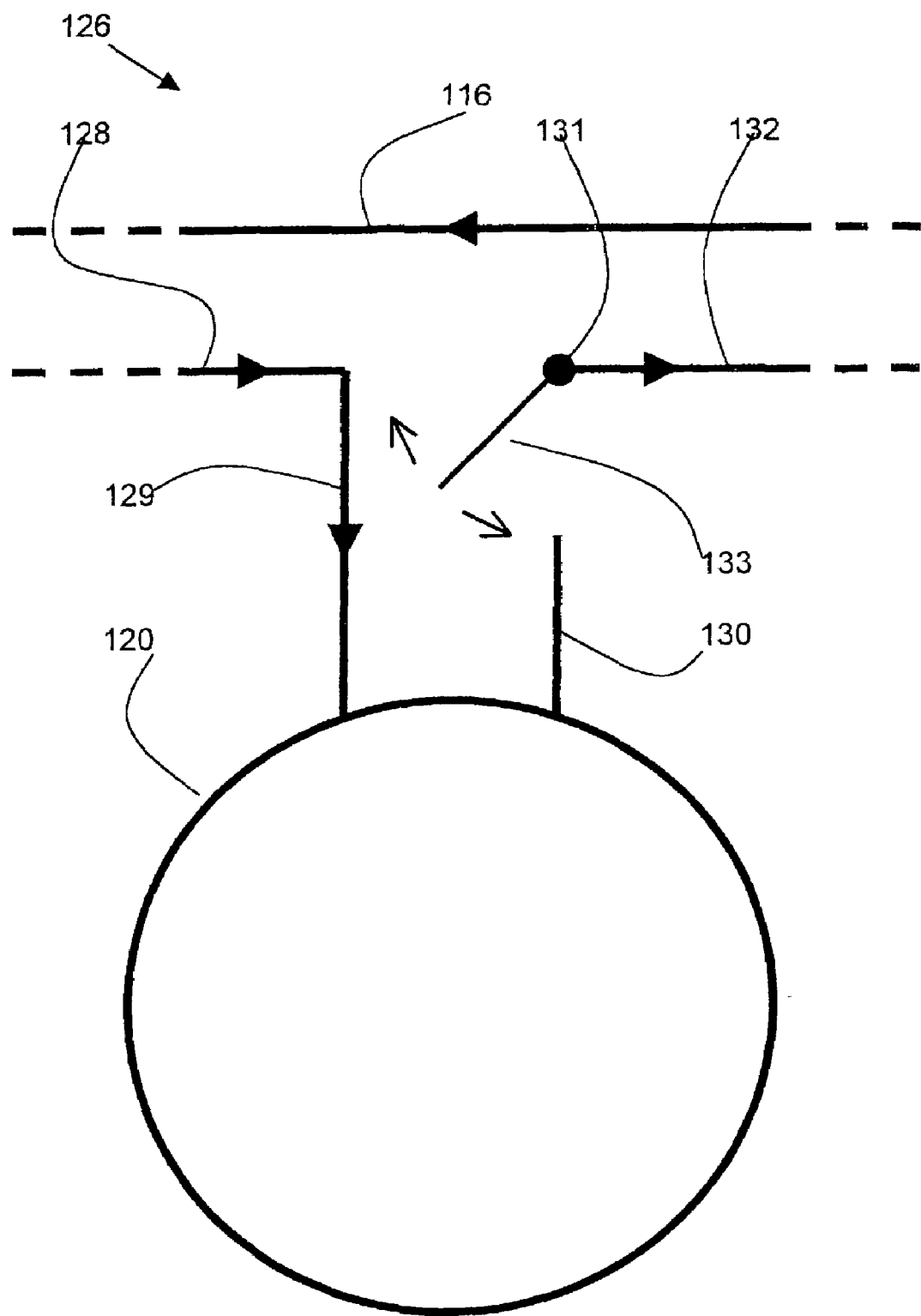
FIG. 1B is a diagram of a detail of FIG. 1A showing a bypass port of a device on the loop network.

FIG. 1B is a detail of a bypass 126 for a device 120 in the first loop 116. The loop 116 has a path 128 travelling from left to right which is routed off along a path 129 to travel to the device 120. The loop 116 returns from the device 120 along a return path 130 parallel to the path 129 to the device 120. The return path 130 meets a junction 131 and continues the left to right path 132 of the loop 116 towards the next device 120. The junction 131 in effect has a switch 133 which can join the left to right paths 128, 132 to bypass the device 120.

Figure 1C:
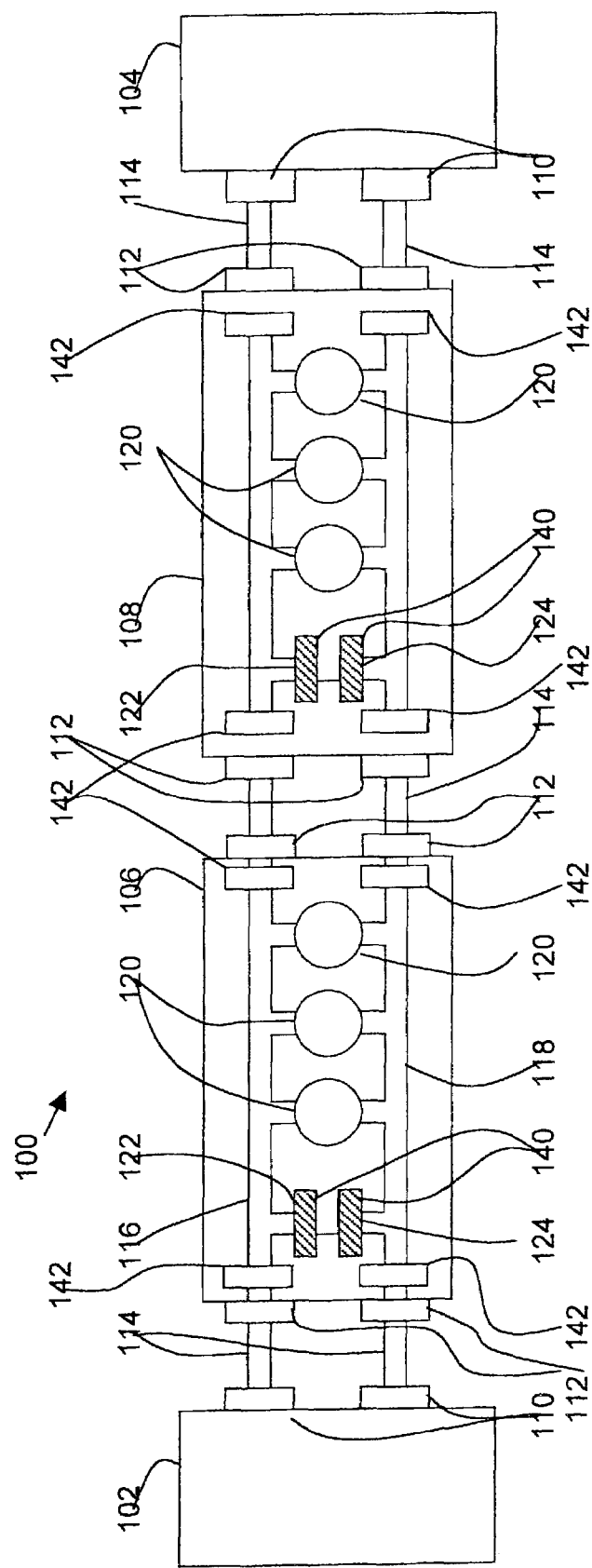
FIG. 1C is a diagram of a dual loop network in accordance with the present invention.

FIG. 1C shows the loop network 100 with a determining device 140 in each enclosure 106, 108. The determining device 140 has the ability to bypass an enclosure 106, 108. Each enclosure 106, 108 has signal detect units 142 at each of the enclosures' four external connectors 110, 112. The signal detect units 142 can bypass the enclosure when a signal is received from the determining device 140. In FIG. 1C, the second enclosure 108 is shown in the bypassed form.

The determining device 140 in an enclosure 106, 108 maybe the enclosure control device 122, 124. Alternatively, the determining device may be a separate device in the enclosure.

The requirements of the described method and apparatus are as follows:

1. An enclosure must have its own NL_Port and is controlled by a device called the determining device.
2. The determining device must have the ability to bypass the enclosure, leaving just an internal FC-AL.
3. The determining device must have the ability to detect slot population in the enclosure or similar.
4. The determining device must have the ability to bypass a given slot's NL_Port, even if populated.

Figure 2:
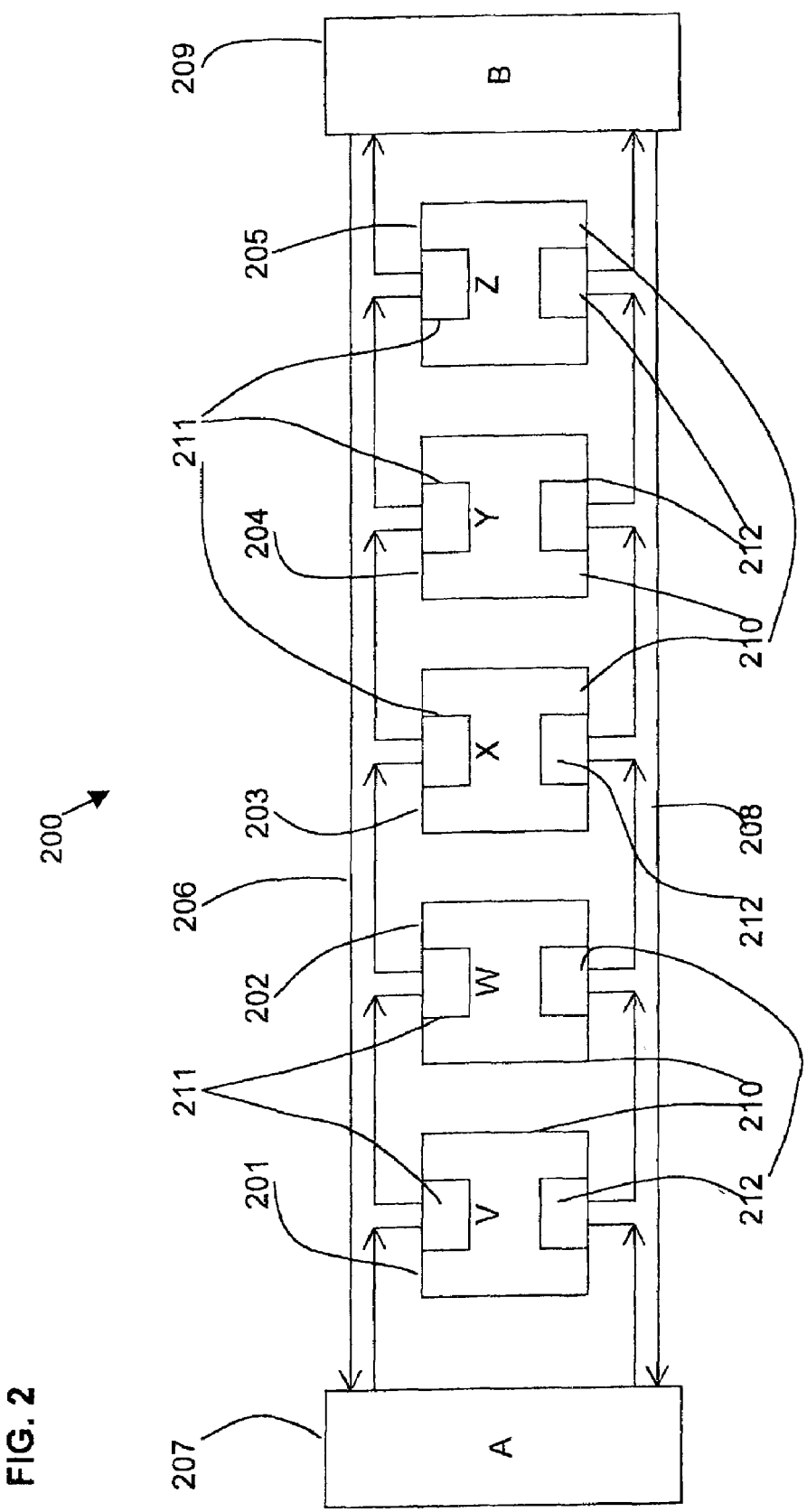
FIG. 2 is a simplified diagram of a dual loop network.

Referring to FIG. 2, a dual loop network 200 is shown in a simplified form with two initiators in the form of two host bus adapters A 207 and B 209 and five targets in the form of five devices 210 which are individually referred to as V 201, W 202, X 203, Y 204 and Z 205. The devices 210 may be disk drives or other loop components.

The loop network 200 has two loops 206, 208 and each of the devices 210 in the loop network 200 is dual ported in that each device 210 has a port 211, 212 on each loop 206, 208.

Devices 210 may also be included which are single ported with a single port on only one of the loops 206, 208.

Each port 211, 212 in a loop network 200 has a port identifier called a "World Wide Port Name" (WWPN). Each node on a loop 206, 208 in the form of devices 210 or host bus adapters 207, 209 also has a World Wide Node Name (WWNN). These are referred to as Node Names and Port Names. To ensure that the WWPN and WWNN are unique they may contain, for example, a unique identifier of the manufacturer of the device including the port and the manufacturer's serial number of the device. The WWPN is too long (usually 64 bits) to be used for source and destination addresses transmitted over the network and therefore the AL_PA is used as a temporary address that is unique to the configuration of the network at any given time.

During initialisation of a loop, a Loop Initialisation Procedure (LIP) allows each port 211, 212 to obtain an Arbitrated Loop Physical Address (AL_PA) that is unique within the loop 206, 208 for that port. This effectively uniquely identifies each port 211, 212 in a loop 206, 208.

Each port continuously transmits Loop Initialisation Sequences (LI_ID="LISM") around the loop which contains the Port Name (the WWPN). The port with the lowest Port Name will bercome the master and will receive the LISM that it sent. Ports will discard a LISM if their Port Name is lower. The maximum time taken to make this decision is AL_TIME as defined in the FC-AL standard as the time in which frames are expected to have travelled around the loop.

The loop initialisation involves one port winning as Loop Initialisation Master (LIM). The LIM port manages the rest of the initialisation procedure. Disk drives 210 can indicate that they do not wish to be the LIM.

The Arbitrated Loop Physical Addresses (AL_PAs) are then allocated to each of the ports 211, 212 in the loop 206, 208. The LIM sends a frame around the loop 206, 208 with bits corresponding to AL PAs. Each port 211, 212 finds the relevant bit for its AL PA and changes the bit from "0" to "1" indicating that the AL_PA is not available for subsequent ports. The AL_PAs can be defined by previous addresses, assigned hardware addresses or software addresses. If there are multiple enclosures, each address indicates the enclosure and the device within the enclosure ensuring that each port 211, 212 in a loop 206, 208 has a unique address.

The initialisation procedure can also send special frames around the loop 206, 208 called the Loop Initialisation Report Position (LIRP) frame and the Loop Initialisation Loop Position (LILP) frame which detail the topology of the loop as seen by the Loop Initialisation Master (LIM). This involves each port 211, 212 indicating in a frame its AL_PA in the order that it is physically situated in the loop. This frame contains each port's AL_PA in turn as seen by the LIM for the whole of the loop and is broadcast around the loop.

The loop initialisation allows a host bus adapter 207, 209 to know where each port 211, 212 is in relation to the adapter 207, 209. The host bus adapter 207, 209 will identify all the devices in a loop including, for example, enclosure control devices as distinct from disk drives and may also determine from an enclosure control devices details of the ports housed within that enclosure control device's enclosure.

The procedure of the present invention is as follows and can be done during an FC-AL Loop Initialisation Procedure.

1. Determine all the populated ports for which there is no known Port Name (this can be done before the Loop Initialisation Procedure starts). The enclosure control device knows if a port is populated and knows if it should have a Port Name. Ports may already be bypassed from the loop, for example due to a fault, and these existing bypassed ports are referred to as disabled ports. The described method should not affect disabled ports. If a port is a disabled port, the enclosure control device will not want to know the Port Name.
If there are no Port Names that need to be determined, then the described method does not need to be carried out. Therefore, the described method is not necessarily carried out at each Loop Initialisation.
2. Bypass all of these populated ports.
3. Bypass the enclosure leaving just the internal FC-AL and send out Idle frames only.
4. Un-bypass the first undetermined populated port and wait enough time for the LISM to be sent (if any). A maximum time here is AL_TIME, by which time the device must have sent any LISM.
5. If no LISM is received, then the device not bypassed is in non-participating mode or is faulty. If a LISM is received then the device's Port Name can be extracted from the LISM frame. If there is an error on the receiver, then the device can be considered as faulty.
6. Bypass the first port again and un-bypass the next port (if any, and if so go to step 5).
7. When done, un-bypass all populated ports which were not already disabled prior to the described procedure.
8. Un-bypass the enclosure re-introducing the enclosure into the larger FC-AL.

Figure 3:
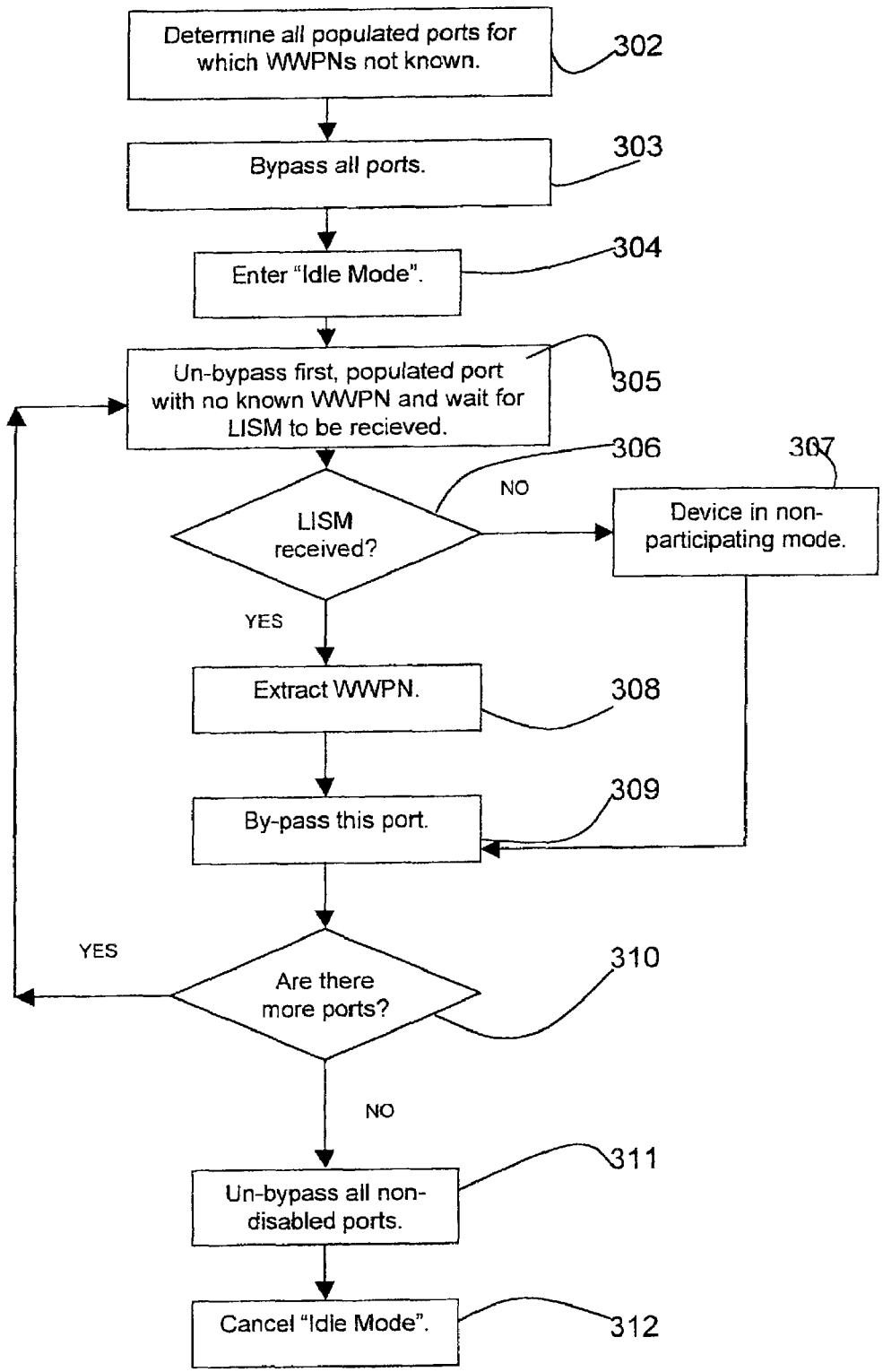
FIG. 3 is a flow diagram of the method in accordance with the present invention.

FIG. 3 shows the above method in the form of a flow diagram. The first three steps ensure that the loop is in a form for carrying out the method of determining the Port Names. Step 302 determines all populated slots for which Port Names are not known. Step 303 bypasses all these populated slots. Step 304 enters the loop into a mode in which the enclosure is bypassed leaving an internal FC-AL with Idle frames being sent out by the determining device. This mode is referred to as "Idle Mode".

At step 305, a first port is un-bypassed for a maximum time of AL_TIME in which time the device should have forwarded an LISM. At step 306 it is determined if the first port sent an LISM. If an LISM has not been received the device which was un-bypassed is in a non-participating mode. If an LISM has been received, then the device's WWPN is extracted from the LISM frame 308 and stored. The first port is then by-passed again 309.

At step 310 it is determined if there are any more ports. If there are more ports, the method goes back to step 305 and repeats the steps to step 310. If there are no more ports, all the ports are un-bypassed 311 and the Idle Mode is cancelled.

Figure 4:
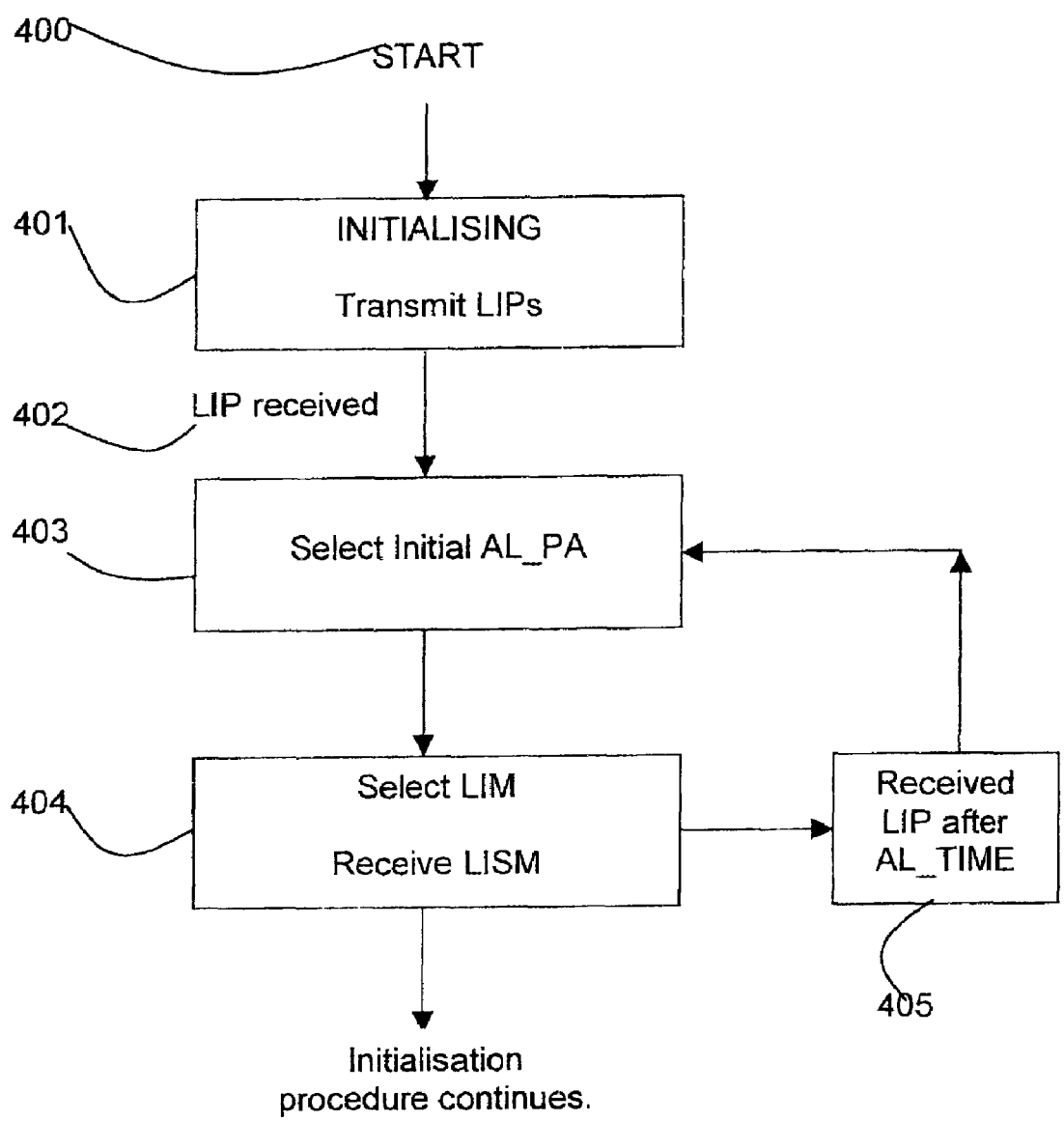
FIG. 4 is a flow diagram of a loop initialisation procedure including the present invention.

FIG. 4 shows a flow diagram of an extract of the Loop Initialisation Procedure as given in Annex P of FC-AL-2 Version 1.0 amended to include the procedure of the present invention.

At step 400, the initialisation procedure is started. At step 401 LIPs are transmitted around the loop. If an LIP is received at a port 402, step 403 is undertaken and an initial AL_PA for that port is selected. At step 404 a LIM (Loop Initialisation Master) is selected and this receives the LISM frame. If the LIP is received after AL_TIME 405, the method loops back to step 403.

In accordance with the described method, the step of bypassing all the slots (step 303 of FIG. 3) is carried out at step 403 in the Loop Initialisation Procedure. Idle frames are transmitted instead of transmitting the LISM frame at step 404.

The determining device now has the Port Names (WWPNs), as supplied in the LISM, of all the populated ports. This information can be obtained from the determining device (which may be an enclosure control device) by known commands sent for retrieving information.

The determining device also re-determines the information if any of the devices are replaced. This can be activated by detecting the un-population and re-population of the slot within the enclosure.

The method described herein is typically implemented as a computer program product, comprising a set of program instructions for controlling a computer or similar device.

These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

What is claimed is:

1. A method for detection of a port name in a loop network, the loop network having a loop, a plurality of devices each device having at least one port on the loop network and each port having a unique hard port name, the method comprising:
   determining which ports are populated with devices for which a port name is not known;
   bypassing populated ports;
   entering a mode on the loop network in which idle frames are transmitted around the loop network; and
   un-bypassing one bypassed port at a time and receiving the port name from the un-bypassed port, without affecting existing port bypasses; wherein the loop network includes at least one enclosure containing one or more devices, each enclosure having an enclosure control device with bypass control over the ports in the enclosure, and wherein the enclosure is bypassed prior to entering the mode in which idle frames are transmitted around the loop network within the enclosure.

2. A method as claimed in claim 1, wherein the un-bypassed port transmits frames including its port name.

3. A method as claimed in claim 1, wherein the method includes un-bypassing the populated ports once the unique port names of the populated ports are known.

4. A method as claimed in claim 1, wherein each enclosure has a determining device, the determining device sending the idle frames and receiving the port names.

5. A method as claimed in claim 1, wherein the loop network is a Fibre Channel ArbitratedLoop (FC-AL) and the unique port name is a World Wide Port Name.

6. A method as claimed in claim 1, wherein the port name is received from the un-bypassed port in a Loop Initialisation Select Master (LISM) frame transmitted by the un-bypassed port.

7. A method as claimed in claim 1, wherein if no port name is received from a device, the device is assumed to be non-participating or faulty.

8. An apparatus for detection of a port name in a loop network, the apparatus comprising:
   a loop network including at least one loop;
   a plurality of devices connected to the loop via ports, each port having a unique hard port name;
   circuitry for bypassing ports on the loop;
   circuitry for determining which ports are populated on the loop with devices for which a port name is not known;
   a determining device configured to enter a mode on the loop network in which idle frames are transmitted around the loop network;
   the determining device receiving and recording the port names for each populated port on the loop; wherein the loop network includes at least one enclosure containing one or more devices, each enclosure having an enclosure control device with bypass control over the ports in the enclosure, and wherein the enclosure includes circuitry for bypassing the enclosure from the loop network and the determining device entering a mode in the bypassed enclosure in which idle frames are transmitted around the enclosure.

9. An apparatus as claimed in claim 8, wherein the determining device is the enclosure control device.

10. An apparatus as claimed in claim 8, wherein the loop network is a dual loop network in which a device has two ports, one on each loop.

11. An apparatus as claimed in claim 8, wherein the loop network is a Fibre Channel Arbitrated Loop (FC-AL) and the unique port name is a World Wide Port Name.

12. An apparatus as claimed in claim 8, wherein the port name is received from an un-bypassed port in a Loop Initialisation Select Master (LISM) frame transmitted by the un-bypassed port.

13. A computer readable storage medium having a stored computer program comprising computer readable program code for detection of device names in a loop network, the loop network having a loop, a plurality of devices each device having at least one port on the loop network and each port having a unique hard port name, where execution of the program code comprises operations of:
   determining which ports are populated with devices for which a port name is not known;
   bypassing populated ports;
   entering a mode on the loop network in which idle frames are transmitted around the loop network;
   un-bypassing one port at a time and receiving the port name from the un-bypassed port, without affecting existing port bypasses; wherein the loop network includes at least one enclosure containing one or more devices, each enclosure having an enclosure control device with bypass control over the ports in the enclosure, and wherein the enclosure is bypassed prior to entering the mode in which idle frames are transmitted around the loop network within the enclosure.

14. A method for operating a data storage system having at least one enclosure that comprises a plurality of disk drives coupled through ports and a Fibre Channel Arbitrated Loop (FC-AL) network to an enclosure controller and a controller external to the enclosure, comprising:
   with the exception of disabled ports, determining if there is at least one populated port within an enclosure for which there is no known Port Name and, if there is at least one populated port for which there is no known Port Name;
   determining the Port Name of the at least one populated port by
   bypassing populated ports;
   bypassing the enclosure, leaving operational a portion of the FC-AL network internal to the enclosure;
   operating the enclosure controller for transmitting Idle frames on the portion of the FC-AL network internal to the enclosure;
   un-bypassing a first populated port for which there is no known Port Name and delaying a period of time sufficient for the un-bypassed port to transmit a Loop Initialization Select Master (LISM) frame; and
   if no LISM frame is received from the un-bypassed first populated port within the period of time, declaring that the un-bypassed first populated port is in a non-participating mode or is faulty, else if a LISM frame is received from the un-bypassed first populated port then extracting the Port Name of a disk drive from the received LISM frame.

15. A method as in claim 14, further comprising bypassing the first populated port and un-bypassing a second populated port for which there is no known Port Name, and continuing until the Port Name of each populated port for which there is no known port name has been determined, or until each populated port for which there is no known port name has been declared to be in the non-participating mode or faulty.

16. A method as in claim 15, further comprising un-bypassing the enclosure.

17. A method as in claim 14, where the extracted Port Name is comprised of a World Wide Port Name, further comprising storing the extracted World Wide Port Name.

18. A method as in claim 17, further comprising transferring a stored World Wide Port Name to the external controller.

19. A data storage system having at least one enclosure that comprises a plurality of disk drives coupled through ports and a Fibre Channel Arbitrated Loop (FC-AL) network to an enclosure controller and a controller external to the enclosure, comprising a device for determining, with the exception of disabled ports, if there is at least one populated port within an enclosure for which there is no known Port Name and, if there is at least one populated port for which there is no known Port Name, for determining the Port Name of the at least one populated port, said determining device comprising circuitry for bypassing populated ports;

circuitry for bypassing the enclosure, leaving operational a portion of the FC-AL network internal to the enclosure; circuitry for transmitting Idle frames on the portion of the FC-AL network internal to the enclosure; circuitry for un-bypassing a first populated port for which there is no known Port Name and for delaying a period of time sufficient for the un-bypassed first populated port to transmit a Loop Initialization Select Master (LISM) frame; and circuitry, responsive to a condition where if no LISM frame is received from the un-bypassed first populated port within the period of time, for declaring that the un-bypassed first populated port is in a non-participating mode or is faulty, and further responsive to a condition where a LISM frame is received from the un-bypassed first populated port for extracting the Port Name of a disk drive from the received LISM frame.

20. A data storage system as in claim 19, where said determining device operates further to bypass the first populated port and un-bypass a second populated port for which there is no known Port Name, and continuing in this manner until the Port Name of each populated port for which there is no known port name has been determined, or until each populated port for which there is no known port name has been declared to be in the non-participating mode or faulty.

21. A data storage system as in claim 20, where said determining device operates further to un-bypass the enclosure.

22. A data storage system as in claim 19, where the extracted Port Name is comprised of a World Wide Port Name, further comprising means for storing the extracted World Wide Port Name.

23. A data storage system as in claim 22, further comprising circuitry for transferring a stored World Wide Port Name to the external controller.

24. A data storage system having at least one enclosure that comprises a plurality of disk drives coupled through ports and a loop network to an enclosure controller and a controller external to the enclosure, comprising means for determining, with the exception of disabled ports, if there is at least one populated port within an enclosure for which there is no known Port Name and, if there is at least one populated port for which there is no known Port Name, for determining the Port Name of the at least one populated port, said determining means comprising means for bypassing populated ports; means for bypassing the enclosure, leaving operational a portion of the loop network internal to the enclosure; means for transmitting idle messages on the portion of the loop network internal to the enclosure; means for un-bypassing a first populated port for which there is no known Port Name and for delaying a period of time sufficient for the un-bypassed port to transmit a loop message; and means, responsive to a condition where if no loop message is received from the un-bypassed first populated port within the period of time, for declaring that the un-bypassed first populated port is in a non-participating mode or is faulty, and further responsive to a condition where a loop message is received from the un-bypassed first populated port for extracting the Port Name of a disk drive from the received loop message.

* * * * *